US006818290B1

(12) United States Patent
Chopra et al.

(10) Patent No.: US 6,818,290 B1
(45) Date of Patent: Nov. 16, 2004

(54) BELT FUSER BELT

(75) Inventors: Sudha Chopra, Lexington, KY (US); Ronald Lloyd Roe, Lexington, KY (US); Mark Stephen Weisman, Jr., Huntington, WV (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 10/673,921

(22) Filed: Sep. 29, 2003

(51) Int. Cl.[7] ......................... B32B 27/18; B32B 27/20; B32B 27/28; G03G 15/20

(52) U.S. Cl. ....................... 428/328; 428/323; 428/403; 428/404; 428/473.5; 399/320; 399/328; 399/329; 399/330; 399/331; 399/333; 399/335

(58) Field of Search ................................ 428/323, 328, 428/403, 404, 473.5; 399/320, 328, 329, 330, 331, 333, 335

(56) References Cited

U.S. PATENT DOCUMENTS

| | | | | |
|---|---|---|---|---|
| 4,406,825 A | | 9/1983 | Pez et al. | |
| 5,145,741 A | * | 9/1992 | Quick | 428/402 |
| 6,157,806 A | | 12/2000 | Elbert et al. | |
| 6,217,963 B1 | * | 4/2001 | Miyamoto et al. | 428/36.91 |
| 6,442,365 B1 | * | 8/2002 | Schlueter et al. | 399/328 |
| 6,500,375 B1 | | 12/2002 | Aulick et al. | |
| 6,505,029 B2 | * | 1/2003 | Ishizaki et al. | 399/333 |
| 6,762,510 B2 | * | 7/2004 | Fock et al. | 257/787 |

* cited by examiner

*Primary Examiner*—Vivian Chen
(74) *Attorney, Agent, or Firm*—John A. Brady

(57) ABSTRACT

This invention comprises a fuser belt (1) of polyimide incorporating surface-oxidized boron nitride. The resulting enhanced flexibility provides continuing strength without physical damage during use of the belt in a belt fuser while thermal conductivity is preserved. The extent of flexibility enhancement observed is dependent on the degree of oxidation. Therefore, oxidation temperature and time of oxidation are key variables that are used to control the degree of oxidation and thereby the resulting improvement in the flex fatigue.

24 Claims, 1 Drawing Sheet

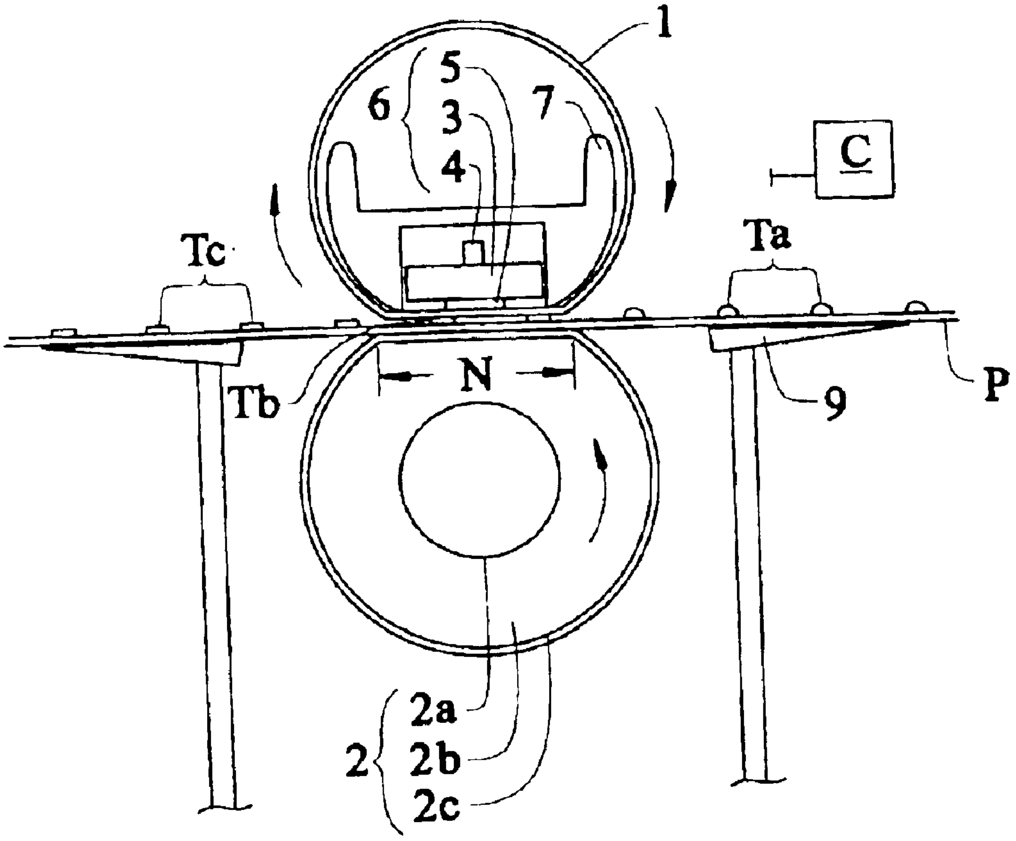
1
5
6
3
7
4
C
Tc
Ta
N
Tb
9
P
2a
2
2b
2c

BELT FUSER BELT

TECHNICAL FIELD

This invention relates to belts used in heat fixing of toner. Such belts typically are moved across a heating element while in contact with paper or other media carrying toner to be fixed into such media by fusing. Such belts desirably have excellent characteristics of heat resistance, heat conductivity, strength with flexibility, and low dielectric constant.

BACKGROUND OF THE INVENTION

Polyimides are attractive in a number of high temperature applications because of their excellent heat resistance and mechanical performance. But like all organic polymers they are inherently heat insulating. Therefore when heat conduction is a desired property, it is common to incorporate inorganic powders such as boron nitride, beryllium oxide, aluminum nitride, silicon carbide, silicon nitride, alumina and silica (in order of decreasing thermal conductivity), that possess high thermal conductivity. In addition, if electrical insulation is also required, the choices are reduced to boron nitride, beryllium oxide, silicon nitride, aluminum nitride and alumina, (in order of increasing dielectric constants).

Among the above mentioned fillers, boron nitride is most widely used because of its combination of high thermal conductivity, low dielectric constant (even at high temperatures), non abrading and non toxic properties. However the addition of boron nitride exponentially degrades the flex fatigue of the polyimide film.

A polyimide that is filled with boron nitride is potentially useful belt fuser. In belt fusers, for which that disclosed in U.S. Pat. No. 6,157,806 is illustrative, toner is fused using a seamless, endless belt which is moved across a ceramic heater. A sheet carrying lose toner in the form of an image is pressed against the belt and heat transmitted by the belt fuses the toner into or onto the sheet. Such a belt is subjected to high temperature and repetitive flexing, while good heat transmission is required. The polyimide layer should be electrically insulative to help prevent electrical short circuits or arcing from the heater. The outer layer, typically of fluoropolymer, should be electrically conductive enough to prevent high voltage from developing on the surface. This is important so as not to attract the toner to the belt.

This invention includes the modification of the surface of boron nitride by oxidizing in air. The oxidation of the boron nitride causes an increase in the flexibility of a polyimide film when compared to a film made with unoxidized boron nitride, at the same filler loading. Oxidized boron nitride is known is the prior art, such as in U.S. Pat. No. 4,406,825 to Pez et al, while a use to improve flexibility is believed novel with respect to this invention.

DISCLOSURE OF THE INVENTION

This invention comprises a fuser belt of polyimide incorporating surface oxidized boron nitride. The resulting enhanced flexibility provides continuing strength without physical damage during use of the belt in a belt fuser. The extent of flexibility enhancement observed is dependent on the degree of oxidation. Therefore, oxidation temperature and time of oxidation are key variables that are used to control the degree of oxidation and thereby the resulting improvement in the flex fatigue.

BRIEF DESCRIPTION OF THE DRAWING

The drawing is a side, cross-sectional view of an illustrative belt fuser, which would employ this invention.

DESCRIPTION OF THE PREFERRED EMBODIMENTS

The heat-conductive polyimide film is made from a polyamic acid solution (polyimide precursor solution) which contains the boron nitride filler at the desired loading. This solution is cured by thermal means that involves the ring closure reaction of the amide and acid groups in the polyamic acid to form a five-member imide moiety, thereby forming a polyimide film.

The polyamic solution containing the boron nitride can be cast in the form of a seamless tube by a variety of techniques, including spin coating, dip coating, applicator blade coating, and roller coating. In one implementation a polyimide tube of seamless construction is obtained by a vertical double dip process. The polyamic acid containing the boron nitride is coated by vertical dip coating onto the outer surface of a cylindrical aluminum part that is about 12" long and 1" wide. The solution is dried and cured on the surface of the aluminum part at the end of which the polyimide can be removed as a seamless tube. Both thermoplastic and thermosetting polyimides can be used but since high temperature resistance for prolonged periods of time and high strength is required for a fusing application, an aromatic polyimide is preferred.

The polyamic acid used in this invention is obtained by the polymerization of 3,3',4,4' biphenyltetracarboxylic dianhydride and p-phenylenediamine in a polar aprotic solvent such as N-methylpyrrolidinone (NMP) at 65° C. The typical polyamic acid concentration ranges from about 10–20% by weight and the viscosity at 25° C. ranges from 10–2000 Poise. The boron nitride powder is incorporated into the polyamic acid in an attritor mill using stainless steel shot as the mill media.

The boron nitride content can range from 5–30% based on the weight of the polyamic acid solids. The shape of the boron nitride particles is hexagonal and the average particle size is about 0.3–0.7 $\mu$m. At higher particle sizes there is loss in flexibility of the polyimide film, due to the increase in the number of inter-particle contacts. This may help increase the thermal conductivity.

Boron nitride powder is hygroscopic and therefore is dried to remove moisture, which can adversely affect the mechanical properties of the polyimide film.

The oxidation of boron nitride is carried out in a muffle furnace at temperatures of 650° C. or greater. This is confirmed by thermogravimetric analysis where a weight gain is observed with increase in oxidation. The oxidation of boron nitride can also be detected by a surface analysis method such as X-ray Photoelectron Spectroscopy. At temperatures greater than 1000° C., the boron nitride powder tends to fuse together to form a hard mass that is very difficult to break and therefore must be dry milled before incorporation into the polyamic acid.

The oxidation is carried out in a shallow crucible with the boron nitride powder evenly spread out to ensure uniform oxidation. The rate of oxidation can also be accelerated, by purging the chamber in the furnace with oxygen gas. The boron nitride powder is cooled in a dessicator before being dispersed into the polyamic acid.

A typical procedure for forming a heat conductive polyimide belt is as follows:

A 500 g batch of polyamic acid (3,3',4,4'-biphenyltetracarboxylic dianhydride-co-p-phenylene diamine amic acid) at 13.5% solids by weight is weighed. To this is added 20.2 g of boron nitride powder (23% by weight of polyamic acid solids, 0.3–0.7 μm). To the above mixture is added 84.4 g of NMP to adjust the total solids content to 14.5% by weight. The mixture is milled for a period of about 6–8 hrs in an attritor mill until a smooth dispersion is obtained. The dispersion is then degassed and filled into a 500 ml graduated cylinder.

The dispersion is coated onto the outer surface of a polished aluminum mandrel that has been coated with a thin glass coating. The glass coating is applied to the aluminum mandrel, by means of plasma assisted sputtering process to enable release of the polyimide tube. The mandrel is vertically dipped into the cylinder and withdrawn at a rate of 0.1 ft/min. It is then dried vertically, in a low air flow convection oven at 125° C. for 60 min.

During the process of drying, there is a drop in dispersion viscosity and due to slow evaporation of NMP, there is a thickness gradient down the length of the mandrel. Therefore, to even out the thickness non-uniformity the direction of the mandrel is flipped and vertically dipped and dried again at 125° C. for 60 min. The dried mandrel is cured by a step cycle that involves a short bake at 200° C./30 min, followed by a bake at 250° C. for/1 hr and a post-bake of 380° C./1 hr. The mandrel is then allowed to cool and the polyimide can be removed as a seamless tube of thickness ranging 50±5 μm.

The flexibility of the polyimide belt samples was evaluated according to the ASTM test method D2176 with necessary modifications made to the tester so as to perform the test in the single bend mode as compared to the double bend as called for in the ASTM test. A sample of 100 mm length and 15 mm width is folded over a 135 degree angle at a rate of 175 folds per min. A load of 0.5 Lb is used. The flex fatigue is defined as the number of single folds to break.

A summary of the flex fatigue data recorded is shown in Table 1 as a function of the oxidation temperature and time. As seen there is a five-fold increase in flex fatigue by oxidizing at 650 degrees C. for 6 hr and greater than fifteen-fold increase by oxidation at 980 degrees C. for 4 hr. Such oxidizing at somewhat different temperatures and periods would have similar results. Testing was stopped when the samples recorded >2,000,000 folds, since at this point the flex fatigue of the boron nitride filled polyimide film is as good as that of a unfilled polyimide film of similar thickness. The flex fatigue required of a heat conductive polyimide belt used in a fuser assembly of a laser printer is about 80,000 single folds. It was also seen that the surface oxidation of boron nitride does not adversely affect the thermal conductivity of the film. (Fully oxidized boron nitride would have lower thermal conductivity.)

With the improvement in flex fatigue seen by using oxidized boron nitride, it can be envisioned that a greater amount of boron nitride can be incorporated into the belt (thereby increasing its thermal conductivity) and still satisfy the flex fatigue requirement of 80,000 folds. This would be advantageous in increasing print speeds.

Improvement in flex fatigue of a boron nitride filled polyimide belt by surface oxidation of the boron nitride powder. Variables used to control the extent of oxidation are temperature and duration of oxidation.

TABLE 1

| Temperature (° C.) | Time (hr) | Flex fatigue | Thermal |
|---|---|---|---|
| No oxidation | | 131,891 +/− 22,518 | 1.0549 +/− 0.0235 |
| 650 | 1 | 150,703 +/− 46,242 | — |
| 650 | 6 | 782,210 +/− 150,222 | 1.2211 +/− 0.0296 |
| 980 | 4 | >2,000,000 | 1.0398 +/− 0.0582 |

Flex fatigue was determined as an average of 3 samples
Thermal conductivity was determined by the hot wire method.

The foregoing lead to the following preferred and more complete embodiment. A polyimide tube of seamless construction was obtained by an applicator blade coating. The boron nitride, polyamic acid, and coating solution were prepared in a manner similar to the foregoing. The mandrel was the same as described in the foregoing, but also having an outer coating of organically modified ceramic (ormocer). The solvent is NMP and the viscosity for coating is between 50,000 cP and 200,000 cP, preferably about 120,000 cP.

The applicator blade coating is made with a process generally similar to that described in U.S. Pat. No. 6,500,175 B1. The process is modified to include 3 doctor blades. Another modification is that the coating solution is disposed continuously to maintain a bead of material in front of the three blades.

The gaps between the blades and mandrel are set at 0.22 mm, 0.44 mm, and 0.58 mm for the first, second, and third blades respectively and such that the first blade with a gap of 0.22 mm is the first to coat the solution on the mandrel. The mandrel is rotated at a speed of 250 rpm. The blades were moved at a rate of 0.6 mm/sec.

Preferably, the first two blades apply about 80% by volume of the coating solution, applied in even amount by each blade, with the last blade applying the remaining 20%. A small excess of coating solution is used, and the excess is physically removed from the margin of the cured belt. Coating as described and the low-speed blade movement 0.6 mm/sec avoids bubbles.

The oven drying occurs in a two step process in two different ovens. The first oven has low air flow and a device to slowly rotate the mandrels during drying. The coated mandrels are heated from ambient to 125° C. over 1.5 hours, then held at 125° C. for 1 hour. The second oven is a programmable muffle furnace. The coated mandrels are not rotated in this oven. The program uses the following steps: (1) ambient to 200° C. at a rate of 20° C./min., (2) hold at 200° C. for 30 min., (3) ramp to 250° C. and hold for 80 min., and (4) ramp to 400° C. and hold for 60 min.

The sample flexibility was measured using the method described in the previous example. Belt thicknesses were 50+/−5 μm. The data is given in Table 2.

TABLE 2

| Temperature (C.) | Time (hr) | Flex fatigue |
|---|---|---|
| No oxidation | | 159,021 |
| 850 | 8 | >2,000,000 |

Referring to the drawing, there is shown an illustrative heating/fixing apparatus using a film belt consistent with this invention and a ceramic heater. Designated by reference number 1 is a fixing film in the form of an endless belt 1 of this invention. Pressing roller 2 consists of shaft 2*a* typically formed from steel, aluminum, or similar metal; a rubber elastic layer 2*b* made of silicon rubber, and surrounded by parting layer 2*c*, typically consisting of a PFA sleeve. Pressing roller 2 is urged to the bottom surface of heater 6 by a resilient member or other urging means (not shown) providing force of about 4 to 7 kilograms with a bottom travel portion of belt 1 interposed between heater 6 and pressing roller 2. Roller 2 is driven by an attached gear (not shown) through connection with a gear series to the printer mechanism gear train. Movement of film 1 is driven by pressing roller 2 and is in the clockwise direction, thereby moving media P in the corresponding direction through the nip formed by belt 1 and pressing roller 2.

Belt 1 is an endless tube, which is rotated by contact with driven pressing roller 2 repeatedly for fixing a toner image. Belt 1 therefore is made of a highly heat resistive and durable material having good parting properties. Belt 1 typically has total thickness of not more than about 100 microns, preferably less than about 55 microns.

To facilitate parting of media P, leaving toner on media P, belt 1 typically has an outer layer (not separately shown) of low surface energy material such polytetrafluoroethylene or similar fluoropolymer. A fluoropolymer primer layer is commonly used between the fluoropolymer topcoat and the polyimide layer. It is usually electrically conductive and, in use, electrically connected to an electrical ground at one end. On the lower, opposite surface of belt 1, the surface which contacts the surface of heater 6, a layer of high viscosity lubricant or grease (not separately illustrated) is applied. The outer layer and the amount of grease are thin in relation to total thickness of belt 1, the exact amounts being a routine matter of design choice for specific materials and intended length of service.

Heater 6 comprises, as major components, a heater substrate (base member) 3, typically of ceramic, extending in a direction substantially perpendicular to the direction of movement of belt 1. Base member 3 is electrically insulative, has a high thermal conductivity, and has high heat resistance, as well as having fast warm-up characteristics. One or more heat-generating electrical resistors 5 in a line or stripe extend along the length of base member 3 on the lower surface of base member 3 (i.e., along the face of heater 6 which directly contacts film 1), and a temperature detecting element 4, for example, a thermistor or thermostat, is mounted in contact with the back face of base member 3 (opposite the face having heat-generating resistors 5). The heat retention of the heater 6, as a whole, is low. Heater 6 is fixed to a holder 7 with the bottom face of heater 6 facing the nip, which receives media P. A thin layer of electrical insulation, such a glass (not shown), covers the heat generating resistor 5 portion of the bottom face of heater 6, thereby coming in direct contact with belt 1 on the side opposite the outer, parting layer of belt 1.

The grease is applied only in sufficient amount to coat the entire inside surface of belt 1. Initially the full amount for that purpose may be applied during manufacture on the bottom face of heater 6. Belt 1 is then placed around heater 6. The grease will be distributed to coat the full inside surface of belt 1 during normal use.

Operation is under control of an electronic data processor such as microprocessor C, shown illustratively. Upon generation of an image formation start signal, an image-forming sequence is carried out under control of processor C in an image-forming station (not shown), and recording media P is supplied to the fixing device guided by an inlet guide 9, and is introduced into a nip N (fixing nip) between the temperature-controlled heat 6 and pressing roller 2, more particularly, between fixing belt 1, and pressing roller 2. Media P is passed through fixing nip N at the same speed as belt 1 is moved with the surface of media P having an unfixed electrophotographic toner image Ta being contacted with the bottom surface of belt 1, which is moving in the same direction as media P. Tb is toner in nip N. Loose toner Ta is fused onto media P, such as paper, to form fixed toner Tc.

In accordance with this invention, belt 1 is polyimide filled with oxidized boron nitride as described in the foregoing. Modifications of the formulation will be apparent to meet varying requirements of durability, heat conductivity and low dielectric response. Accordingly, the foregoing details should be considered illustrative and not limiting.

What is claimed is:

1. A belt for a heat fuser comprising polyimide resin body having incorporated within said body particulate, surface-oxidized boron nitride.

2. The belt as in claim 1 in which said boron nitride is surface oxidized at about 850 degrees C.

3. The belt as in claim 2 in which said boron nitride is surface oxidized for about 8 hours.

4. The belt as in claim 3 in which said polyimide comprises a reaction product of a 3,3',4,4' biphenyltetracarboxylic dianhydride and p-phenylenediamine.

5. The belt as in claim 4 in which said boron nitride comprises hexagonal particles of average particle size of about 0.3 to 0.7 μm.

6. The belt as in claim 3 in which said boron nitride comprises hexagonal particles of average particle size of about 0.3 to 0.7 μm.

7. The belt as in claim 2 in which said polyimide comprises a reaction product of a 3,3',4,4' biphenyltetracarboxylic dianhydride and p-phenylenediamine.

8. The belt as in claim 7 in which said boron nitride comprises hexagonal particles of average particle size of about 0.3 to 0.7 μm.

9. The belt as in claim 2 in which said boron nitride comprises hexagonal particles of average particle size of about 0.3 to 0.7 μm.

10. The belt as in claim 1 in which said polyimide comprises a reaction product of a 3,3',4,4' biphenyltetracarboxylic dianhydride and p-phenylenediamine.

11. The belt as in claim 10 in which said boron nitride comprises hexagonal particles of average particle size of about 0.3 to 0.7 μm.

12. The belt as in claim 1 in which said boron nitride comprises hexagonal particles of average particle size of about 0.3 to 0.7 μm.

13. A toner fixing system comprising a heating element to generate heat for fusing electrophotographic toner, a belt with a surface in contact with said heating element movable in contact with said heating element;

a back up member in nip position with said belt where said belt contact said heating element; and a media feed path to feed media carrying unfixed toner images through said nip;

wherein said belt comprises a polyimide resin body having incorporated within said body particulate, surface-oxidized boron nitride.

14. The belt as in claim 13 in which said boron nitride is surface oxidized at about 850 degrees C.

15. The belt as in claim 14 in which said boron nitride is surface oxidized for about 8 hours.

16. The belt as in claim 15 in which said polyimide comprises a reaction product of a 3,3',4,4' biphenyltetracarboxylic dianhydride and p-phenylenediamine.

17. The belt as in claim 16 in which said boron nitride comprises hexagonal particles of average particle size of about 0.3 to 0.7 μm.

18. The belt as in claim 15 in which said boron nitride comprises hexagonal particles of average particle size of about 0.3 to 0.7 μm.

19. The belt as in claim 14 in which said polyimide comprises a reaction product of a 3,3',4,4' biphenyltetracarboxylic dianhydride and p-phenylenediamine.

20. The belt as in claim 19 in which said boron nitride comprises hexagonal particles of average particle size of about 0.3 to 0.7 μm.

21. The belt as in claim 14 in which said boron nitride comprises hexagonal particles of average particle size of about 0.3 to 0.7 μm.

22. The belt as in claim 13 in which said polyimide comprises a reaction product of a 3,3',4,4' biphenyltetracarboxylic dianhydride and p-phenylenediamine.

23. The belt as in claim 22 in which said boron nitride comprises hexagonal particles of average particle size of about 0.3 to 0.7 μm.

24. The belt as in claim 13 in which said boron nitride comprises hexagonal particles of average particle size of about 0.3 to 0.7 μm.

* * * * *